(12) United States Patent
Nakamura

(10) Patent No.: US 11,300,263 B2
(45) Date of Patent: Apr. 12, 2022

(54) CEILING ILLUMINATION WINDOW

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 42 days.

(21) Appl. No.: 17/055,563

(22) PCT Filed: Apr. 10, 2019

(86) PCT No.: PCT/JP2019/015716
§ 371 (c)(1),
(2) Date: Nov. 14, 2020

(87) PCT Pub. No.: WO2019/220824
PCT Pub. Date: Nov. 21, 2019

(65) Prior Publication Data
US 2021/0115730 A1 Apr. 22, 2021

(30) Foreign Application Priority Data

May 16, 2018 (JP) .............................. JP2018-094215

(51) Int. Cl.
*F21S 11/00* (2006.01)
*E06B 9/24* (2006.01)
(Continued)

(52) U.S. Cl.
CPC .............. *F21S 11/007* (2013.01); *E06B 9/24* (2013.01); *F21V 5/02* (2013.01); *F21V 7/05* (2013.01); *E06B 2009/2417* (2013.01)

(58) Field of Classification Search
CPC .. F21S 11/007; E06B 9/24; F21V 5/02; G02B 5/045
(Continued)

(56) References Cited

U.S. PATENT DOCUMENTS 4,557,565 A   12/1985   Ruck et al.
5,461,496 A   10/1995   Kanada et al.
(Continued)

FOREIGN PATENT DOCUMENTS

DE   693 28 156 T2   12/2000
JP   58-73682 A   5/1983
(Continued)

*Primary Examiner* — Christopher E Mahoney
(74) *Attorney, Agent, or Firm* — Keneally Vaidya LLP

(57) ABSTRACT

A ceiling illumination window is provided with a transparent prism, and a reflecting member provided on a second edge of the transparent prism. Further, the transparent prism is installed in such a way as to enable light incident thereon at an angle, relative to a normal line to first and second transparent plates, that is at least equal to a prescribed angle to be reflected at a third edge using a critical angle. In addition, when light is incident at an angle at least equal to the prescribed angle relative to the normal line, the transparent prism emits the light toward an indoor ceiling side using at least two types of optical path having different numbers of reflections, using reflection at least one of the transparent prism surface and the reflecting member, and when light is incident at an angle less than the prescribed angle, the transparent prism allows the light to be transmitted through the third edge.

4 Claims, 3 Drawing Sheets

(51) Int. Cl.
    *F21V 5/02*      (2006.01)
    *F21V 7/05*      (2006.01)
(58) Field of Classification Search
    USPC .......................................................... 359/597
    See application file for complete search history.

(56)                References Cited

U.S. PATENT DOCUMENTS

| | | | |
|---|---|---|---|
| 5,650,875 | A | 7/1997 | Kanada et al. |
| 5,880,886 | A * | 3/1999 | Milner ................... G02B 5/045 |
| | | | 359/593 |
| 6,311,437 | B1 * | 11/2001 | Lorenz ..................... F21S 11/00 |
| | | | 52/173.3 |
| 9,803,818 | B2 * | 10/2017 | Nango ....................... E06B 9/24 |
| 2008/0030859 | A1 | 2/2008 | Usami |
| 2011/0296795 | A1 | 12/2011 | Tsai |
| 2012/0033302 | A1 * | 2/2012 | Suzuki ............. B29D 11/00605 |
| | | | 359/627 |
| 2012/0194913 | A1 | 8/2012 | Tsai et al. |
| 2012/0222722 | A1 | 9/2012 | Baruchi et al. |
| 2015/0049387 | A1 | 2/2015 | Kashiwagi et al. |

FOREIGN PATENT DOCUMENTS

| | | |
|---|---|---|
| JP | 2000-268610 A | 9/2000 |
| JP | 2009-266794 A | 11/2009 |
| JP | 2011-123478 A | 6/2011 |
| JP | 2013-232330 A | 11/2013 |
| JP | 2013-235860 A | 11/2013 |
| JP | 2017-161735 A | 9/2017 |
| WO | WO-2019220823 A1 * | 11/2019 |

\* cited by examiner

[FIG. 1]
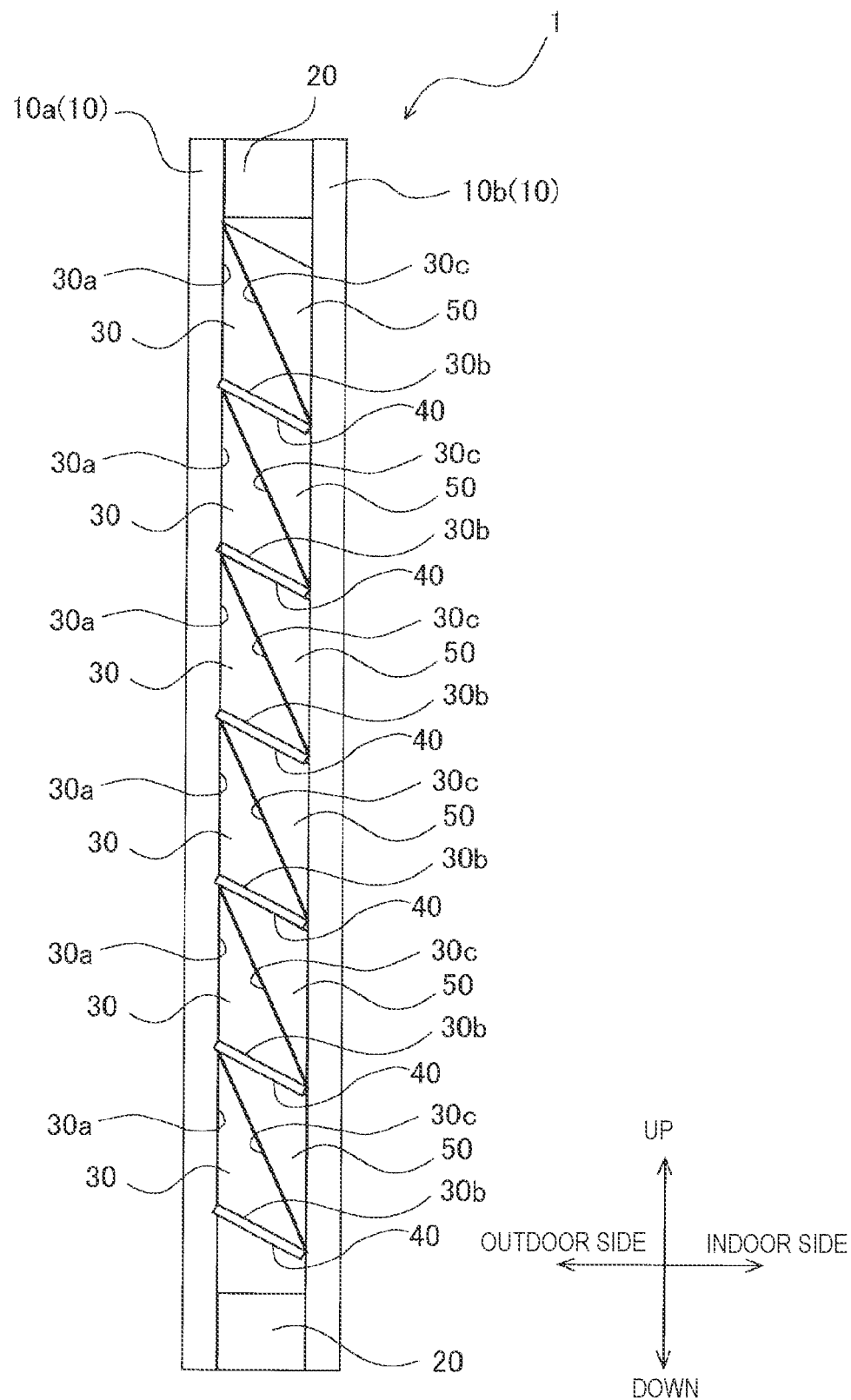

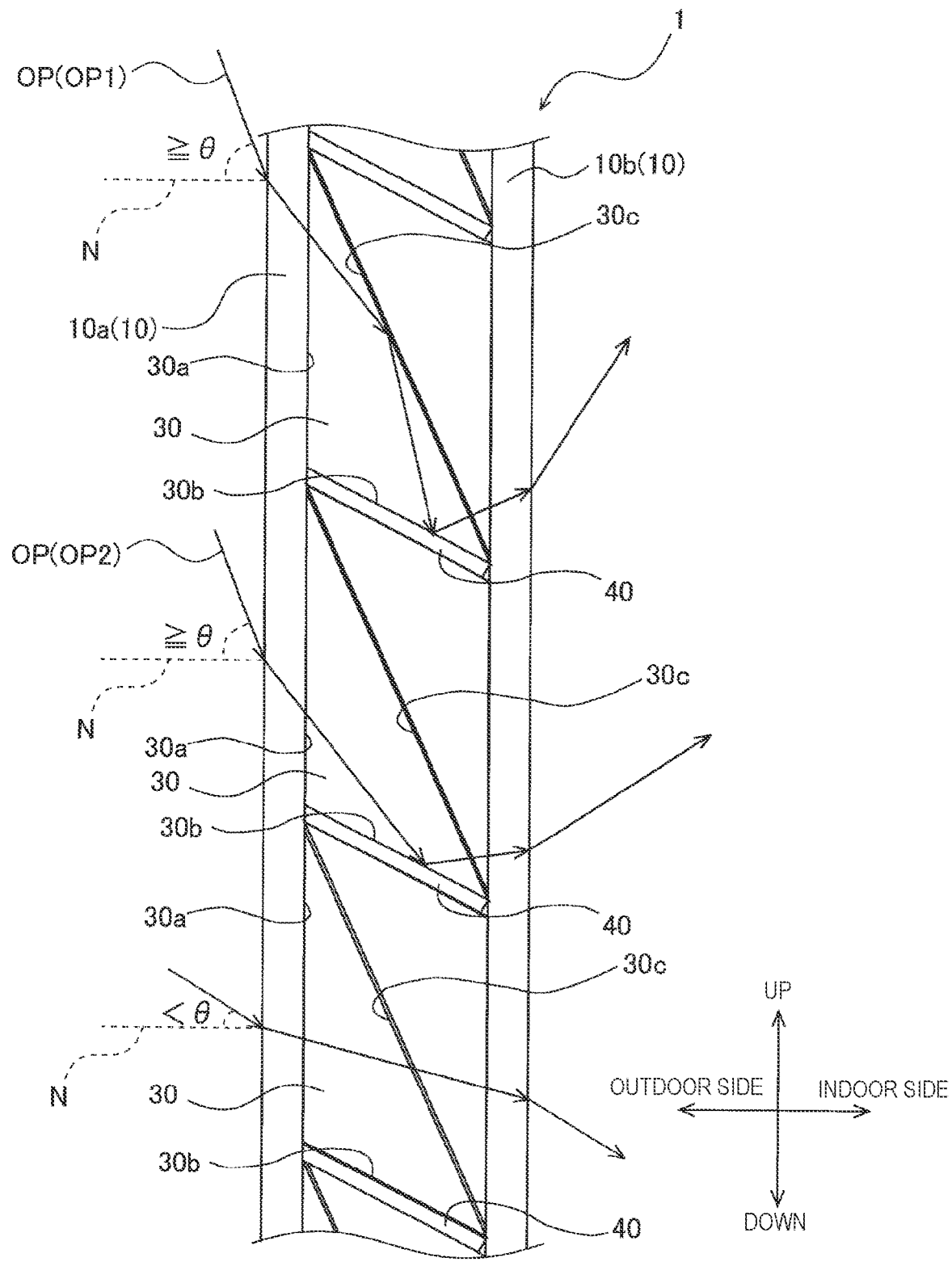
[FIG. 2]

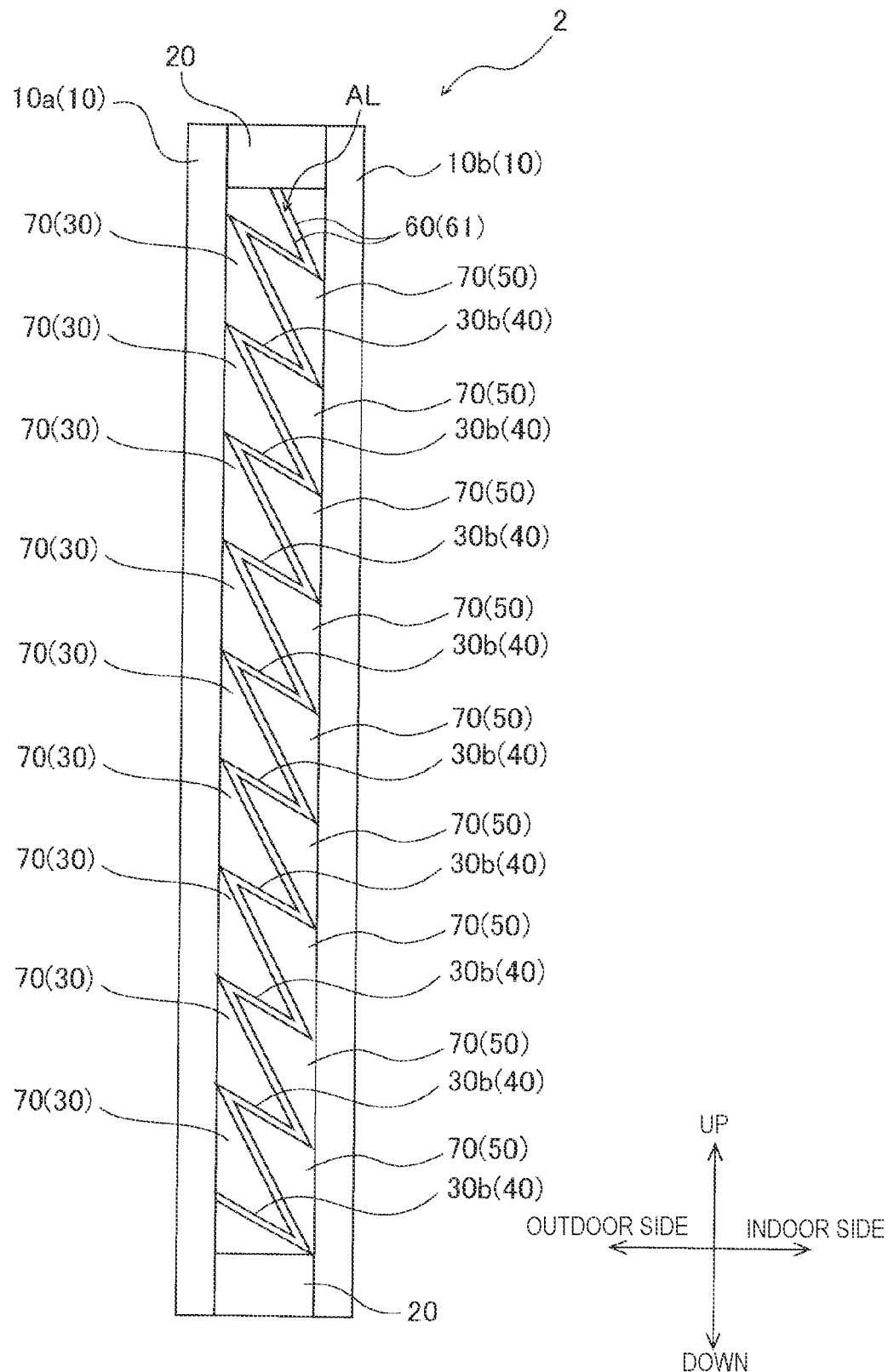
[FIG. 3]

CEILING ILLUMINATION WINDOW

TECHNICAL FIELD

The present invention relates to a ceiling illumination window.

BACKGROUND ART

Conventionally, there has been proposed ceiling illumination windows that reflect direct light from the sun on a ceiling side in a room (see Patent Literatures 1 to 5). The ceiling illumination windows are configured to pass the direct light when a height of the sun is high and reflect the direct light when the height of the sun is low on the ceiling side.

However, the ceiling illumination windows passes the direct light when the sun height in summer is high and illuminates a floor surface. In particular, the direct light tends to illuminate only a side proximal to a window in summer than in winter and the room tends to be dark, but the ceiling illumination windows cannot address this matter.

Therefore, there has been proposed a ceiling illumination window in which direct light is reflected on a ceiling side also in summer, reflected light toward the ceiling side is emitted to the ceiling side at various angles, and light can be illuminated from a window side to a back side of a room (see Patent Literature 6). The ceiling illumination window has a structure including a parabolic surface opened to an indoor side of the window and a parabolic surface opened to an outdoor side of the window, and bottom portions of the parabolic surface on the outdoor side and the parabolic surface on the indoor side are connected to each other to form a connected parabolic surface.

CITATION LIST

Patent Literature

Patent Literature 1: JP-A-2011-123478
Patent Literature 2: JP-A-2013-235860
Patent Literature 3: JP-A-S58-73682
Patent Literature 4: JP-A-2000-268610
Patent Literature 5: JP-A-2009-266794
Patent Literature 6: JP-A-2013-232330

SUMMARY OF INVENTION

Technical Problem

Here, in order to increase an amount of light that illuminates the ceiling in the ceiling illumination window described in Patent Literature 6, it is necessary to provide a large number of connected parabolic surfaces. However, since metal is deposited on an inner surface of the connected parabolic surface in the ceiling illumination window described in Patent Literature 6, a view becomes difficult to see. That is, it is difficult to achieve both brighter illumination of the ceiling and easiness of seeing the view.

The present invention has been made in order to solve such a problem, and an object thereof is to provide a ceiling illumination window capable of illuminating a room from a window side to a back side in summer and achieving both brighter illumination of a ceiling and easiness of seeing a view.

Solution to Problem

The ceiling illumination window according to the present invention includes a transparent prism provided between the first and second transparent plate members and a reflection member provided on a first predetermined surface of the transparent prism. The transparent prism is installed to enable light incident at an angle relative to a normal line to the first and second transparent plate members, which is equal to or greater than a predetermined angle, to be reflected at a second predetermined surface using a critical angle of the second predetermined surface. In addition, the transparent prism emits light toward an indoor ceiling side in two or more types of optical paths having different reflection times using reflection on at least one of a surface of the transparent prism and the reflection member when light is incident at an angle relative to the normal line, which is equal to or greater than the predetermined angle, and passes the second predetermined surface when light is incident at an angle less than the predetermined angle.

Advantageous Effects of Invention

According to the ceiling illumination window according to the present invention, since the transparent prism emits light toward the indoor ceiling side in two or more types of optical paths having different reflection times when light having the predetermined angle or more is incident, emission angles can be made different in the two or more types of optical paths respectively. Accordingly, it is possible to prevent a situation in which only a specific region of the ceiling can be illuminated as a case where there is only one emission angle, and the room can be illuminated from the window side to the backside in summer. Since reflection using the critical angle is performed on the second predetermined surface different from the first predetermined surface on which the reflection member is provided, it is possible to prevent the view from being invisible by providing the reflection member on the second predetermined surface, and to reduce deterioration of easiness of seeing the view. In addition, in order to increase a light amount of ceiling illumination, the light incident on the transparent prism may be condensed on the reflection member, so that it is not necessary to excessively increase the number of the reflection members. As described above, the room can be illuminated from the window side to the back side in summer, and both brighter illumination of the ceiling and easiness of seeing a view can be achieved.

BRIEF DESCRIPTION OF DRAWINGS

FIG. 1 is a cross-sectional view showing a ceiling illumination window according to a first embodiment.

FIG. 2 is a conceptual diagram showing an optical path by a transparent prism shown in FIG. 1.

FIG. 3 is a cross-sectional view showing a ceiling illumination window according to a second embodiment.

DESCRIPTION OF EMBODIMENTS

Hereinafter, the present invention will be described according to suitable embodiments. The present invention is not limited to the embodiments to be described below and can be changed as appropriate without departing from the spirit of the present invention. In the embodiments to be described below, some configurations may not be illustrated or described, but it goes without saying that a publicly known or commonly known technique is appropriately applied to details of an omitted technique within a range where no contradiction occurs with contents to be described below.

FIG. 1 is a cross-sectional view showing a ceiling illumination window according to a first embodiment. The ceiling illumination window 1 shown in FIG. 1 schematically includes two transparent plate members 10, sealing members 20, transparent prisms 30, reflection members 40, and image restoration prisms 50.

The two transparent plate members 10 are transparent plate members such as a glass member and a resin member substantially parallel to each other. The two transparent plate members 10 are a first transparent plate member 10a and a second transparent plate member 10b. The first transparent plate member 10a is disposed on an outdoor side, and the second transparent plate member 10b is disposed on an indoor side of the first transparent plate member 10a.

The sealing members 20 are interposed between the two transparent plate members 10 at peripheral end portions of the two transparent plate members 10. By providing the sealing members 20 at the peripheral end portions of the two transparent plate members 10, an internal space closed by the two transparent plate members 10 and the sealing members 20 is formed, and the transparent prisms 30, the reflection members 40, and the image restoration prisms 50 are provided in the internal space.

The transparent prisms 30 are disposed in the internal space between the two transparent plate members 10 and each includes a prism made of a transparent member having a plurality of surfaces. The transparent prism 30 has an obtuse triangular shape (that is, an obtuse triangular prism) in cross section and is disposed such that an obtuse angle portion faces the outdoor side.

Such a transparent prism 30 is disposed facing (in the first embodiment, disposed in contact with) the first transparent plate member 10a such that a first side 30a of the transparent prism 30 is along the first transparent plate member 10a. A second side (first predetermined surface) 30b and a third side (second predetermined surface) 30c of the transparent prism 30 extend at predetermined angles relative to the first side 30a. The second side 30b is a side located vertically below the third side 30c. The transparent prism 30 is in a state in which the second side 30b, which is the lower side, is slightly inclined to the indoor side. That is, an indoor side end portion of the second side 30b is located lower than an outdoor side end portion of the second side 30b.

The transparent prism 30 is disposed in contact with the first transparent plate member 10a in the first embodiment but is not limited thereto, and may be disposed slightly separated from the first transparent plate member 10a. In addition, as long as the transparent prism 30 has the first side 30a, the second side 30b, and the third side 30c, any one or more corners of a triangular shape may be cut off and become a polygon in a cross-sectional view, or any one or more corners may be curved to obtain various shapes. In addition, the ceiling illumination window 1 may further include a transparent connection member for connecting a plurality of transparent prisms 30 provided over up and down. In this case, the transparent connection member may be formed integrally with the plurality of transparent prisms 30 or may be formed separately, and may be made of the same material as the transparent prism 30, or may be made of another material. The first transparent plate member 10a may be made to function as such a transparent plate member.

The reflection member 40 is a member that reflects light, and is, for example, a member having a reflectance of 70% or more of visible light and infrared light in the present embodiment. The reflection member 40 is provided in a contact state with the second side 30b of the transparent prism 30. The reflection member 40 may be provided in a separated state from the transparent prism 30. Further, the reflection member 40 is preferably formed by performing mirror processing (silver processing) on the second side 30b of the transparent prism 30.

In the internal space between the two transparent plate members 10, the image restoration prism 50 is a prism installed to fill a space in which the transparent prism 30 is not provided, and functions as a prism that corrects refraction of light from a direction of a normal line N (see FIG. 2) by the transparent prism 30. In the present embodiment, the image restoration prism 50 is provided one for one transparent prisms 30. A slight gap is provided between the image restoration prism 50 and the transparent prism 30. The image restoration prism 50 has approximately the same (for example, ±10%) area as the transparent prism 30 in a cross-sectional view. When the refractive indices of the transparent prism 30 and the image restoration prism 50 are equal, if cross-sectional shapes of the two are the same, image restoration can be performed with better appearance. The image restoration prism 50 is not limited to a case of being provided one for one transparent prism 30, and a plurality of image restoration prisms 50 may be provided for one transparent prism 30, or one image restoration prism 50 may be provided for a plurality of transparent prisms 30 by devising the shape.

FIG. 2 is a conceptual diagram showing an optical path by the transparent prism 30 shown in FIG. 1. As shown in FIG. 2, the transparent prism 30 is installed to enable light at an angle relative to a normal line N to the first and second transparent plate members 10a, 10b, which is equal to or greater than a predetermined angle (for example, 28 degrees), to be reflected at a third side 30c using a critical angle at the third side 30c. Therefore, when direct light OP from the sun having the predetermined angle θ or more is incident on the transparent prism 30 and reaches the third side 30c, the direct light OP is totally reflected at a critical angle or more.

When the direct light OP from the sun having the predetermined angle θ or more is incident on such a transparent prism 30, it is possible to realize two or more types of optical paths having different reflection times using reflection on at least one of the surface of the transparent prism 30 and the reflection member 40 (strictly, reflection of only the reflection member 40 and reflection of both the reflection member 40 and the surface of the transparent prism 30), and light is emitted toward an indoor ceiling side in such two or more types of optical paths.

An example will be described. First, as shown in FIG. 2, it is assumed that the direct light OP having an angle relative to the normal line N to the two transparent plate members 10 is the predetermined angle θ (for example, 28 degrees) or more. Such direct light OP includes the following 1) and 2).
1) Light totally reflected at the third side 30c, reaching the reflection member 40 provided for the second side 30b, and reflected to the indoor ceiling side. 2) Light reaching the reflection member 40 directly provided for the second side 30b and reflected to the indoor ceiling side. The former is denoted by a reference sign OP, and the latter is denoted by a reference sign OP2.

By totally reflecting the direct light OP1 at the third side 30c, an incident angle relative to the reflection member 40 tends to be small. Therefore, an emission angle also decreases, and light emitted from the ceiling illumination window 1 illuminates the ceiling on a proximal side of the room. On the other hand, since the direct light OP2 reaches the reflection member 40 inclined to the indoor side without being totally reflected at the third side 30c, the incident angle relative to the reflection member 40 tends to increase. Therefore, the emission angle also increases, and light emitted from the ceiling illumination window 1 illuminates an indoor back side ceiling.

The direct light OP1 is reflected twice and the direct light OP2 is reflected once, but may be reflected three or more times according to the incident angle. For example, there are three times of reflection: direct light is totally reflected at the third side 30c and then further totally reflected at the first side 30a, and reaches the reflection member 40 to be reflected toward the indoor ceiling side. Emission angles when such three or more times of reflection occur are different from emission angles of the direct light OP1, OP2.

Here, the refractive indices of the transparent prism 30 and the image restoration prism 50 shown in FIG. 1 are more than 1 and 1.59 or less, and an angle of the reflection member 40 relative to the normal line N is preferably 32 degrees or more and 40 degrees or less. This is because, in the above refractive indices, an installation angle of the reflection member 40 is easily brought close to a horizontal direction and the angle is 32 degrees or more and 40 degrees or less, so that it is possible to prevent a situation in which the reflection member 40 is provided vertically and the view is extremely difficult to see while optimizing an inclination state of the reflection member 40 toward the indoor side. In particular, such an angle can be very suitable for a transom.

Specifically, a relationship between the refractive indices of the transparent prism 30 and the image restoration prism 50 and the angle of the reflection member 40 is as shown in

TABLE 1

| Refractive index | Transparent prism | 1.59 | 1.47 | 1.41 | 1.34 |
|---|---|---|---|---|---|
| | Image restoration prism | 1.59 | 1.47 | 1.41 | 1.34 |
| Reflection member angle [°] | | 40 | 34 | 32 | 34 |

Here, the refractive indices are not limited to a range of more than 1 and 1.59 or less, and more preferably, a general glass material has an upper limit value of more than 1 and 1.52 or less. Further, from the viewpoint of reducing the angle of the reflection member 40, the refractive indices are 1.34 or more and 1.47 or less, and the angle of the reflection member 40 is more preferably 32 degrees or more and 34 degrees or less.

Next, operation of the ceiling illumination window 1 according to the first embodiment will be described with reference to FIGS. 1 and 2.

First, direct light from the sun (the direct light having an angle relative to the normal line N equal to or greater than the predetermined angle θ) OP1, OP2 is incident on the first transparent plate member 10a in summer. At this time, the direct light OP1, OP2 pass the first transparent plate member 10a and reach the transparent prism 30.

The direct light OP1 reaching the transparent prism 30 is totally reflected at the third side 30c and reaches the reflection member 40 provided for the second side 30b. At this time, since the direct light OP1 is incident on the reflection member 40 through total reflection at the third side 30c, the incident angle is small to illuminate the ceiling on a side proximal to the ceiling illumination window 1.

The direct light OP2 reaching the transparent prism 30 reaches the reflection member 40 directly provided for the second side 30b. Here, since the reflection member 40 is inclined to the indoor side, the incident angle of the direct light OP2 to the reflection member 40 is large to illuminate the indoor back side ceiling.

Further, the direct light reaching the transparent prism 30 is totally reflected at the third side 30c and the first side 30a to reach the reflection member 40 provided for the second side 30b, and there are also three times of reflection at the reflection member 40. Further, there are also five times of reflection or the like. In the reflection, the direct light is emitted from the second transparent plate member 10b to the indoor ceiling side at an angle different from those of the direct light OP1, OP2.

Therefore, the ceiling illumination window 1 according to the first embodiment can illuminate the ceiling from a window side to the back side of the room.

In this way, according to the ceiling illumination window 1 of the first embodiment, since the transparent prism 30 emits light toward the indoor ceiling side in two or more types of optical paths having different reflection times when light having the predetermined angle θ or more is incident, emission angles can be made different in the two or more types of optical paths respectively. Accordingly, it is possible to prevent a situation in which only a specific region of the ceiling can be illuminated as a case where there is only one emission angle, and the room can be illuminated from the window side to the backside in summer. Since reflection using the critical angle is performed on the third side 30c different from the second side 30b on which the reflection member 40 is provided, it is possible to prevent the view from being invisible by providing the reflection member on the third side 30c, and to reduce deterioration of easiness of seeing the view. In addition, in order to increase a light amount of ceiling illumination, the light incident on the transparent prism 30 may be condensed on the reflection member 40, so that it is not necessary to excessively increase the number of the reflection members 40. As described above, the room can be illuminated from the window side to the back side in summer, and both brighter illumination of the ceiling and easiness of seeing a view can be achieved.

Further, since the reflection member 40 is provided on the second side 30b which is a bottom surface of the transparent prism 30, it is possible to realize a simple path in which the direct light OP from the sun reaching from above is taken into the transparent prism 30 and then reflected by the bottom surface and guided to the indoor ceiling side, and to contribute to simplification of the configuration.

In addition, since the image restoration prism 50 is included, it is possible to reduce distortion of an outdoor view viewed from the room, and to improve appearance of the view.

Further, since the transparent prism 30 and the image restoration prism 50 are made of material having a refractive index of more than 1 and 1.59 or lower, the angle of the reflection member 40 relative to the normal line is easily set to a low angle on design in the ceiling illumination window including the reflection member 40 on the bottom surface. Moreover, since the angle is set to 32 degrees or more and 40 degrees or less, it is possible to prevent a situation in which the reflection member 40 is provided vertically and the view is extremely difficult to see while optimizing an inclination state of the reflection member 40 toward the indoor side.

Next, a second embodiment of the present invention will be described. A multistage ceiling illumination window according to the second embodiment is the same as that of the first embodiment, but a partial configuration thereof is different. In the following description, the same or identical elements as those in the first embodiment are denoted by the same reference signs, and description thereof is omitted.

FIG. 3 is a cross-sectional view showing the ceiling illumination window according to the second embodiment. The ceiling illumination window 2 shown in FIG. 3 schematically includes two transparent plate members 10, sealing members 20, a thin film 60, and soft resin 70.

The thin film 60 is a transparent film disposed between the first transparent plate member 10a and the second transparent plate member 10b. The thin film 60 is made of, for example, a polyethylene terephthalate (PET) film, and is disposed in a zigzag shape with a predetermined angle in a cross-sectional view. The thin film 60 is disposed in a zigzag shape so as to extend in an up-down direction along the first transparent plate member 10a and the second transparent plate member 10b.

Such a thin film 60 includes two individual films 61. The two individual films 61 extend in a zigzag shape (which may be a substantially zigzag shape including a curved surface or the like in a portion) to neighborhoods of upper and lower ends of the ceiling illumination window 2. Further, the two individual films 61 are in a separated state from each other with a predetermined interval therebetween, which is an air layer AL.

The soft resin 70 is made of, for example, silicone gel (refractive index: 1.41) or hydrogel (refractive index: 1.34), and is filled between the thin film 60 and the first transparent plate member 10a and between the thin film 60 and the second transparent plate member 10b. In the ceiling illumination window 2 according to the second embodiment, as a result of filling the soft resin 70 between the thin film 60 and the first transparent plate member 10a the thin film 60 is included on an outdoor side of the thin film 60 to form the transparent prism 30. Similarly, in the ceiling illumination window 2, as a result of filling the soft resin 70 between the thin film 60 and the second transparent plate member 10b, the thin film 60 is included on an indoor side of the thin film 60 to form the image restoration prism 50. In the transparent prism 30 according to the second embodiment, a refractive index and an angle are set so as to realize the same optical path as that of the first embodiment.

Further, in the two individual films 61, the reflection member 40 is formed at a position which is the second side (second predetermined surface) 30b. The reflection member 40 is provided, for example, by a printing technique such as ink jet before the two individual films 61 are three-dimensionally molded.

The ceiling is illuminated in such a ceiling illumination window 2 according to the second embodiment as in the first embodiment. That is, since the direct light OP1 is incident on the reflection member 40 through total reflection at the third side 30c, the incident angle is small to illuminate the ceiling on a side proximal to the ceiling illumination window 2. On the other hand, since the direct light OP2 reaches the reflection member 40 without being totally reflected at the third side 30c, the incident angle to the reflection member 40 is large to illuminate the indoor back side ceiling. In the case of three times of reflection or the like, light is emitted toward different positions of the indoor ceiling. Therefore, the ceiling illumination window 2 can illuminate the ceiling from the window side to the back side of the room.

In this way, according to the ceiling illumination window 2 of the second embodiment, similarly to the first embodiment, the room can be illuminated from the window side to the back side in summer, and both brighter illumination of the ceiling and easiness of seeing a view can be achieved. It can contribute to simplification of the configuration, and the view appearance can be improved. Further, it is possible to prevent a situation in which the reflection member 40 is provided vertically and the view is extremely difficult to see while optimizing an inclination state of the reflection member 40 toward the indoor side.

Although the present invention has been described above based on the embodiments, the present invention is not limited to the above embodiments, and modification may be made without departing from the spirit of the present invention, or techniques of the embodiments may be appropriately combined within a possible range. Further, publicly known or commonly known techniques may be combined as appropriate within a possible range.

For example, in the above embodiments, an angle of the reflection member 40 relative to the horizontal direction is not limited to 32 degrees or more and 40 degrees or less as long as a part of the direct light OP is allowed to transmit to the outside.

Further, the ceiling illumination windows 1, 2 according to the present embodiment may be configured such that the shape of the transparent prism 30 can be changed if possible, and the two or more types of optical paths can be realized in one shape thereof. When an example is given, for example, in the second embodiment, a shape change using expansion and contraction of the thin film 60 due to temperature may be performed, and the two or more types of optical paths can be realized in one shape thereof.

The ceiling illumination windows 1, 2 include, but may not particularly include the image restoration prism 50. Further, the image restoration prism 50 may be integrated or the like with the second transparent plate member 10b.

Although the present invention has been described in detail and with reference to particular embodiments, it will be apparent to those skilled in the art that various changes and modifications can be made without departing from the spirit and scope of the invention.

The present application is based on Japanese Patent Application No. 2018-094215 filed on May 16, 2018, the contents of which are incorporated herein by reference.

REFERENCE SIGNS LIST 1, 2: Ceiling illumination window
10: Transparent plate member
10a: First transparent plate member
10b: Second transparent plate member
30: Transparent prism
30a: First side (surface of transparent prism)
30b: Second side (first predetermined surface, surface of transparent prism)
30c: Third side (second predetermined surface, surface of transparent prism)
40: Reflection member
50: Image restoration prism
60: Thin film
70: Soft resin
AL: Air layer
N: Normal line
OP, OP1, OP2: Direct light
θ: Predetermined angle

The invention claimed is:
1. A ceiling illumination window comprising:
a first transparent plate member;
a second transparent plate member disposed in substantially parallel to the first transparent plate member and disposed on an indoor side of the first transparent plate member;

a transparent prism disposed between the first transparent plate member and the second transparent plate member and having a plurality of surfaces;

a reflection member disposed in contact with or separated from a first predetermined surface of the transparent prism and configured to reflect light, wherein the transparent prism is installed to enable light incident at an angle relative to a normal line to the first transparent plate member and the second transparent plate member, which is equal to or greater than a predetermined angle, to be reflected at a second predetermined surface different from the first predetermined surface using a critical angle at the second predetermined surface;

wherein the transparent prism emits light toward an indoor ceiling side in two or more types of optical paths having different reflection times using reflection on at least one of a surface of the transparent prism and the reflection member when light is incident at an angle relative to the normal line, which is equal to or greater than the predetermined angle; and wherein when light is incident at an angle relative to the normal line, which is less than the predetermined angle, the transparent prism passes the light through the second predetermined surface.

2. The ceiling illumination window according to claim 1, wherein the transparent prism has a first side, a second side and a third side, the first side along the first transparent plate member and the second transparent plate member, the second side and the third side extending at predetermined angles relative to the first side in a cross-sectional view;

wherein the second side corresponds to the first predetermined surface provided lower than the third side, and the third side corresponds to the second predetermined surface; and wherein the first predetermined surface is inclined such that an indoor side end portion of the first predetermined surface is lower than an outdoor side end portion of the first predetermined surface.

3. The ceiling illumination window according to claim 2, further comprising:

an image restoration prism configured to correct refraction of light from a direction of the normal line by the transparent prism.

4. The ceiling illumination window according to claim 3, wherein the transparent prism and the image restoration prism are configured by material having a refractive index of more than 1 and 1.59 or less, and an angle of the reflection member relative to the normal line is 32 degrees or more and 40 degrees or less.

* * * * *